US010453444B2

(12) United States Patent
Zitouni et al.

(10) Patent No.: US 10,453,444 B2
(45) Date of Patent: Oct. 22, 2019

(54) INTENT AND SLOT DETECTION FOR DIGITAL ASSISTANTS

(71) Applicant: Microsoft Technology Licensing, LLC, Redmond, WA (US)

(72) Inventors: Imed Zitouni, Bellevue, WA (US); Dongchan Kim, Seattle, WA (US); Young-Bum Kim, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 15/661,855

(22) Filed: Jul. 27, 2017

(65) Prior Publication Data

US 2019/0035387 A1 Jan. 31, 2019

(51) Int. Cl.
*G10L 15/06* (2013.01)
*G06N 20/00* (2019.01)
*G10L 15/18* (2013.01)
*G06F 17/27* (2006.01)

(52) U.S. Cl.
CPC .......... *G10L 15/063* (2013.01); *G06F 17/279* (2013.01); *G06N 20/00* (2019.01); *G10L 15/1815* (2013.01)

(58) Field of Classification Search
USPC ................................................. 704/241–243
See application file for complete search history.

(56) References Cited

U.S. PATENT DOCUMENTS

| 8,572,011 B1 * | 10/2013 | Sculley, II | G06N 99/005 706/13 |
| 2009/0157571 A1 * | 6/2009 | Smith | G06K 9/6256 706/12 |
| 2011/0219012 A1 * | 9/2011 | Yih | G06F 16/00 707/749 |

(Continued)

FOREIGN PATENT DOCUMENTS

| EP | 1571652 A2 | 9/2005 |
| WO | 2017007742 A1 | 1/2017 |

OTHER PUBLICATIONS

Hakkani-Tur, et al., "Multi-Domain Joint Semantic Frame Parsing Using Bi-Directional RNN-LSTM", In Journal of Interspeech, vol. 2016, Sep. 8, 2016, 5 Pages.

(Continued)

*Primary Examiner* — Leonard Saint Cyr
(74) *Attorney, Agent, or Firm* — Jeffrey L. Ranck; Ranck IP Law

(57) ABSTRACT

Described herein is a mechanism to adapt a machine learning model used in a language understanding model that has been trained using a first set of user input having a first set of features to effectively operate using user input having a second set of features. Losses are defined based on the first set of features, the second set of features or features common to both the first set and second set. The losses comprise one or more of a source side tagging loss, a reconstruction loss, an adversarial domain classification loss, a non-adversarial domain classification loss, an orthogonality loss, and target (Continued)

side tagging loss. The losses are jointly minimized using a gradient descent method and the resulting coefficients are used to retrain the machine learning model.

20 Claims, 7 Drawing Sheets

(56) References Cited

U.S. PATENT DOCUMENTS

| | | | | |
|---|---|---|---|---|
| 2013/0204810 | A1* | 8/2013 | Morinaga | G06N 20/00 706/12 |
| 2013/0204811 | A1* | 8/2013 | Morinaga | G06N 20/00 706/12 |
| 2015/0227845 | A1 | 8/2015 | Hakkani-tur et al. | |
| 2015/0248586 | A1* | 9/2015 | Gaidon | G06K 9/00711 382/103 |
| 2017/0083829 | A1* | 3/2017 | Kang | G06N 3/0454 |
| 2018/0018570 | A1* | 1/2018 | Mizoguchi | G06F 17/17 |
| 2018/0046912 | A1* | 2/2018 | Kurata | G06N 3/0454 |
| 2018/0203848 | A1* | 7/2018 | Perez | G10L 25/30 |
| 2018/0365874 | A1* | 12/2018 | Hadap | G06T 11/60 |

OTHER PUBLICATIONS

Han, et al., "Learning Fashion Compatibility with Bidirectional LSTMs", In Proceedings of the ACM on Multimedia Conference, Jul. 18, 2017, 9 Pages.

"International Search Report and Written Opinion Isssued in PCT Application No. PCT/US2018/034967", dated Aug. 28, 2018, 12 Pages.

Chidlovskii, et al., "Domain Adaptation in the Absence of Source Domain Data", In Proceedings of the 22nd ACM SIGKDD International Conference on Knowledge Discovery and Data Mining, Aug. 13, 2016, 10 pages.

Bhargava, et al., "Easy Contextual Intent Prediction and Slot Detection", In Proceedings of IEEE International Conference on Acoustics, Speech and Signal Processing, May 26, 2013, 5 pages.

Kim, et al., "Domain Attention with an Ensemble of Experts", In Proceedings of in Annual Meeting of the Association for Computational Linguistics, Jul. 30, 2017, 11 pages.

Bulo, et al., "Randomized Prediction Games for Adversarial Machine Learning", In Journal of Computing Research Repository, Sep. 2016, pp. 1-15.

Sankaranarayanan, et al., "Generate to Adapt: Aligning Domains using Generative Adversarial Networks", In Journal of Computing Research Repository, Apr. 2017, 10 pages.

Ajakan, et al., "Domain-Adversarial Neural Networks", In Journal of Computing Research Repository, Dec. 2014, 9 pages.

Mansour, et al., "Domain Adaptation with Multiple Sources", In Journal of Advances in neural information processing systems, 2009, pp. 1-8.

Bahdanau, et al., "Neural Machine Translation by Jointly Learning to Align and Translate", In Journal of Computing Research Repository, Sep. 2014, pp. 1-15.

Ben-David, et al., "Analysis of representations for domain adaptation", In Journal of Advances in neural information processing systems, vol. 19, Dec. 2007, 8 pages.

Bousmalis, et al., "Domain separation networks", In Journal of Advances in Neural Information Processing Systems, vol. 29, Dec. 5, 2016, pp. 1-15.

Daume III, Hal, "Frustratingly easy domain adaptation", In Journal of Computing Research Repository, Jul. 2009, 9 pages.

Ganin, et al., "Domain-adversarial training of neural networks", In the Journal of Machine Learning Research, vol. 17, Issue 1, Jan. 2016, pp. 1-35.

Graves, Alex, "Supervised Sequence Labelling with Recurrent Neural Networks", In Publication of Springer, 2012, 55 pages.

Hochreiter, et al., "Long short-term memory", In Journal of Neural Computation, vol. 9, Issue 8, Nov. 15, 1997, pp. 1735-1780.

Kim, et al., "Frustratingly easy neural domain adaptation", In Proceedings of the 26th International Conference on Computational Linguistics, Dec. 14, 2016, 10 pages.

Kingma, et al., "Adam: A method for stochastic optimization", In Proceedings of the International Conference on Learning Representations, May 7, 2015, pp. 1-15.

Lample, et al., "Neural architectures for named entity recognition", In Journal of Computing Research Repository, Mar. 2016, 11 pages.

Neubig, et al., "Dynet: The dynamic neural network toolkit", In Journal of Computing Research Repository, Jan. 2017, pp. 1-33.

Schuster, et al., "Bidirectional recurrent neural networks", In Journal of IEEE Transactions on Signal Processing, vol. 45, Issue 11, Nov. 1997, pp. 2673-2681.

Srivastava, et al., "Dropout: a simple way to prevent neural networks from overfitting", In Journal of Machine Learning Research, vol. 15, Issue 1, Jan. 2014, pp. 1929-1958.

Zhang, et al., "Aspect-augmented Adversarial Networks for Domain Adaptation", In Journal of Computing Research Repository, Jan. 2017, 12 pages.

* cited by examiner

INTENT AND SLOT DETECTION FOR DIGITAL ASSISTANTS

FIELD

This application relates generally to digital assistants and other dialog systems. More specifically, this application relates to improvements in intent and slot detection for language understand models used in digital assistants and other dialog systems.

BACKGROUND

Natural language understanding is one component of digital assistants and other dialog systems. The natural language understanding component uses machine learning models to extract semantic meaning from input into the system.

Training a machine learning model in a natural language understanding component is typically accomplished at startup by using synthetic data created by a developer or other entity. However, such synthetic data is inevitably mismatched to actual user input which causes relatively lower semantic meaning recognition until sufficient data is collected and the model retrained. Collecting sufficient data can take a relatively long period of time.

In addition to the cold start model, statistics on input tend to shift over time. This means that even if a machine learning model is well trained, over time system performance can degrade because the input statistics shift.

It is within this context that the present embodiments arise.

DETAILED DESCRIPTION

Figure 1:
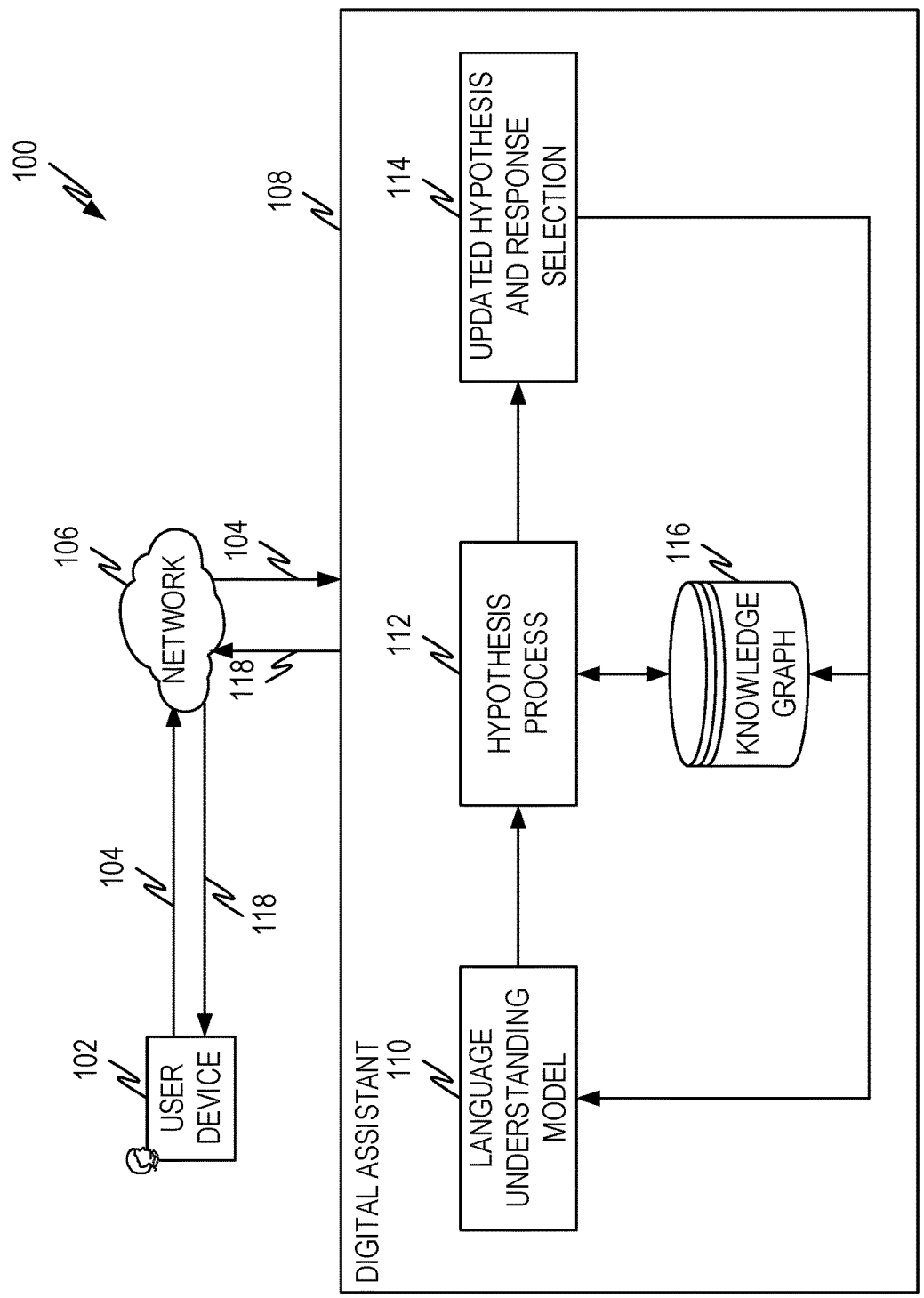
FIG. 1 illustrates an example architecture of a digital assistant system.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

In recent years, users are increasingly relying on digital assistants and other conversational agents (e.g., chat bots) to access information and perform tasks. In order to accomplish the tasks and queries sent to a digital assistant and/or other conversational agent, the digital assistant and/or other conversational agent utilizes a language understanding model to help convert the input information into a semantic representation that can be used by the system. A machine learning model is often used to create the semantic representation from the user input.

The semantic representation of a natural language input can comprise one or more intents and one or more slots. As used herein, "intent" is the goal of the user. For example, the intent is a determination as to what the user wants from a particular input. The intent may also instruct the system how to act. A "slot" represents actionable content that exists within the input. For example, if the user input is "show me the trailer for Avatar," the intent of the user is to retrieve and watch content. The slots would include "Avatar" which describes the content name and "trailer" which describes the content type. If the input was "order me a pizza," the intent is to order/purchase something and the slots would include pizza, which is what the user desires to order. The intents/slots are often organized into domains, which represent the scenario or task the input belongs to at a high level, such as communication, weather, places, calendar, and so forth.

One challenge in building digital assistants and/or other conversational agents is how to build robust intent detection and slot tagging modules. When building a new machine learning model for intent detection and/or slot tagging, no user data typically exists and synthetic data constructed to mimic expected user input is often used to initially train the machine learning model. It is difficult to create synthetic training data that closely matches actual user input. Additionally, it is difficult to create enough synthetic training data to fully train the machine learning model. This is the so called "cold start" problem. The difference between the synthetic training data and actual user data causes a domain shift, called a deployment shift.

In the case of existing (i.e., trained) machine learning models for intent detection and/or slot tagging, the data used to train the machine learning model can become obsolete over time since user input tends to have different features over time. For example, the way that users ask for things, the things they ask for, and other aspects change over time. This also causes a domain shift, in this case called a temporal shift.

A distribution mismatch between stale training data (synthetic training data and/or 'old' training data) and current user input leads to a model that over-fits the flawed training data and performs poorly when the output is evaluated to identify the correctness and robustness of the model. Thus, one technical problem that exists with current training methodologies is to be able to develop a trained machine learning model that is more robust in the face of new data.

The present disclosure presents an approach to solving the technical problem that approaches the problem as a domain adaptation problem. This approach treats the flawed training data set as a source domain and the evaluation data set as a target domain. The systems use an advanced neural domain adaptation engine that includes adversarial training based on randomized predictions. The system can be used in both supervised and unsupervised training approaches and yields surprising improvement over traditional approaches.

The system starts with a representation of three Bi-directional Long Short Term Memory (BiLSTM) Neural Networks as encoders. One encoder induces source-specific features, one encoder induces target-specific features and one encoder induces domain-invariant features (i.e., features that will not distinguish source domain from target domain). Based on the representation of these three encoders, several losses are derived. These losses represent losses that exist in the system as the system shifts from the flawed source domain data (e.g., the synthetic or old stale data) to the target domain data. The system then uses the aggregate losses as a joint optimization opportunity and applies a numerical method to take steps along the gradient until a local minimum is reached within a threshold amount. The resultant machine learning coefficients are then used to in the machine learning model (another BiLSTM Network).

A system implementing the disclosed training method will start with the derived loss representations and select one or more losses for joint optimization. The numerical method then minimizes the aggregate of the selected losses. The resultant coefficients are then applied to a BiLSTM Network used in a language understanding model to yield a trained language understanding model.

The description below also presents test results that show the surprising improvement in accuracy of intent detection and slot tagging that result from the disclosed training methodologies.

Description

FIG. 1 illustrates an example architecture 100 of a digital assistant system. The present disclosure is not limited to digital assistant systems, but can be applied in any system that utilizes machine learning to convert user input into a semantic representation (e.g., intent(s) and slot(s)). However, the example of a digital assistant will be used in this description to avoid awkward repetition that the applied system could be any system that utilizes machine learning to convert user input into a semantic representation.

The simplified explanation of the operation of the digital assistant is not presented as a tutorial as to how digital assistants work, but is presented to show how the machine learning process that can be trained by the system(s) disclosed herein operate in a representative context. Thus, the explanation has been kept to a relatively simplified level in order to provide the desired context yet not devolve into the detailed operation of digital assistants.

A user may use a computing device 102 of some sort to provide input to and receive responses from a digital assistant system 108, typically over a network 106. Example computing devices 102 can include, but are not limited to, a mobile telephone, a smart phone, a tablet, a smart watch, a wearable device, a personal computer, a desktop computer, a laptop computer, a gaming device, a television, or any other device such as a home appliance or vehicle that can use or be adapted to use a digital assistant.

In some implementations, a digital assistant may be provided on the computing device 108. In other implementations, the digital assistant may be accessed over the network and be implemented on one or more networked systems as shown.

User input 104 may include, but is not limited to, text, voice, touch, force, sound, image, video and combinations thereof. This disclosure is primarily concerned with natural language processing and thus text and/or voice input is more common than the other forms, but the other forms of input can also utilized machine learning techniques that can be trained using the embodiments disclosed herein.

User input 104 is transmitted over the network to the digital assistant 108. The digital assistant comprises a language understanding model 110, a hypothesis process 112, an updated hypothesis and response selection process 114, and a knowledge graph or other data source 116 that is used by the system to effectuate the user's intent.

The various components of the digital assistant 108 can reside on or otherwise be associated with one or more servers, cloud computing environments and so forth. Thus, the components of the digital assistant 108 can reside on a single server/environment or can be disbursed over several servers/environments. For example, the language understanding model 110, the hypothesis process 112 and the updated hypothesis and response selection process 114 can reside on one server or set of servers while the knowledge graph 116 can be hosted by another server or set of servers. Similarly, some or all the components can reside on user device 102.

User input 104 is received by the digital assistant 108 and is provide to the language understanding model 110. In some instances, the language understanding model 110 or another component converts the user input 104 into a common format such as text that is further processed. For example, if the input is in voice format, a speech to text converter can be used to convert the voice to text for further processing. Similarly, other forms of input can be converted or can be processed directly to create the desired semantic representation.

The language understanding model 110 converts the user input 104 into a semantic representation that includes at least one intent and at least one slot. As used herein, "intent" is the goal of the user. For example, the intent is a determination as to what the user wants from a particular input. The intent may also instruct the system how to act. A "slot" represents actionable content that exists within the input. For example, if the user input is "show me the trailer for Avatar," the intent of the user is to retrieve and watch content. The slots would include "Avatar" which describes the content name and "trailer" which describes the content type. If the input was "order me a pizza," the intent is to order/purchase something and the slots would include pizza, which is what the user desires to order. The intents/slots are often organized into domains, which represent the scenario or task the input belongs to at a high level, such as communication, weather, places, calendar, and so forth.

In this disclosure, the term "domain" can be used in one of two contexts and care should be taken to distinguish the two contexts. The first possibility is as described above. Domain is used to describe a broad scenario or task that user input belongs to at a high level such as communication, weather, places, calendar and so forth. The experimental results described below will use domain in this context to show the various user input that was utilized as test data to show performance of the system.

The second possibility is "domain" is also used in the context of "domain adaptation" or DA which is the basic approach taken herein to develop the system of machine learning model training that is presented in the disclosure. Thus, the source "domain" represented by the flawed or stale training data is being adapted to the target "domain" of actual user data. Since the two uses of this term are not similar, the context should be sufficient to prevent any confusion that should arise.

The semantic representation with its intent(s) and slot(s) are used to generate one or more hypotheses that are processed by the hypothesis process 112 to identify one or more actions that may accomplish the user intent. The hypothesis process 112 utilizes the information in the knowledge graph 116 to arrive at these possible actions.

The possible actions are further evaluated by updated hypothesis and response selection process 114. This process 114 can update the state of the conversation between the user and the digital assistant 108 and make decisions as to whether further processing is necessary before a final action is selected to effectuate the intent of the user. If the final action cannot or is not yet ready to be selected, the system can loop back through the language understanding model 110 and/or hypothesis processor 112 to develop further information before the final action is selected.

Once a final action is selected, the response back to the user 118, either accomplishing the requested task or letting the user know the status of the requested task, is provided by the digital assistant 108.

Figure 2:
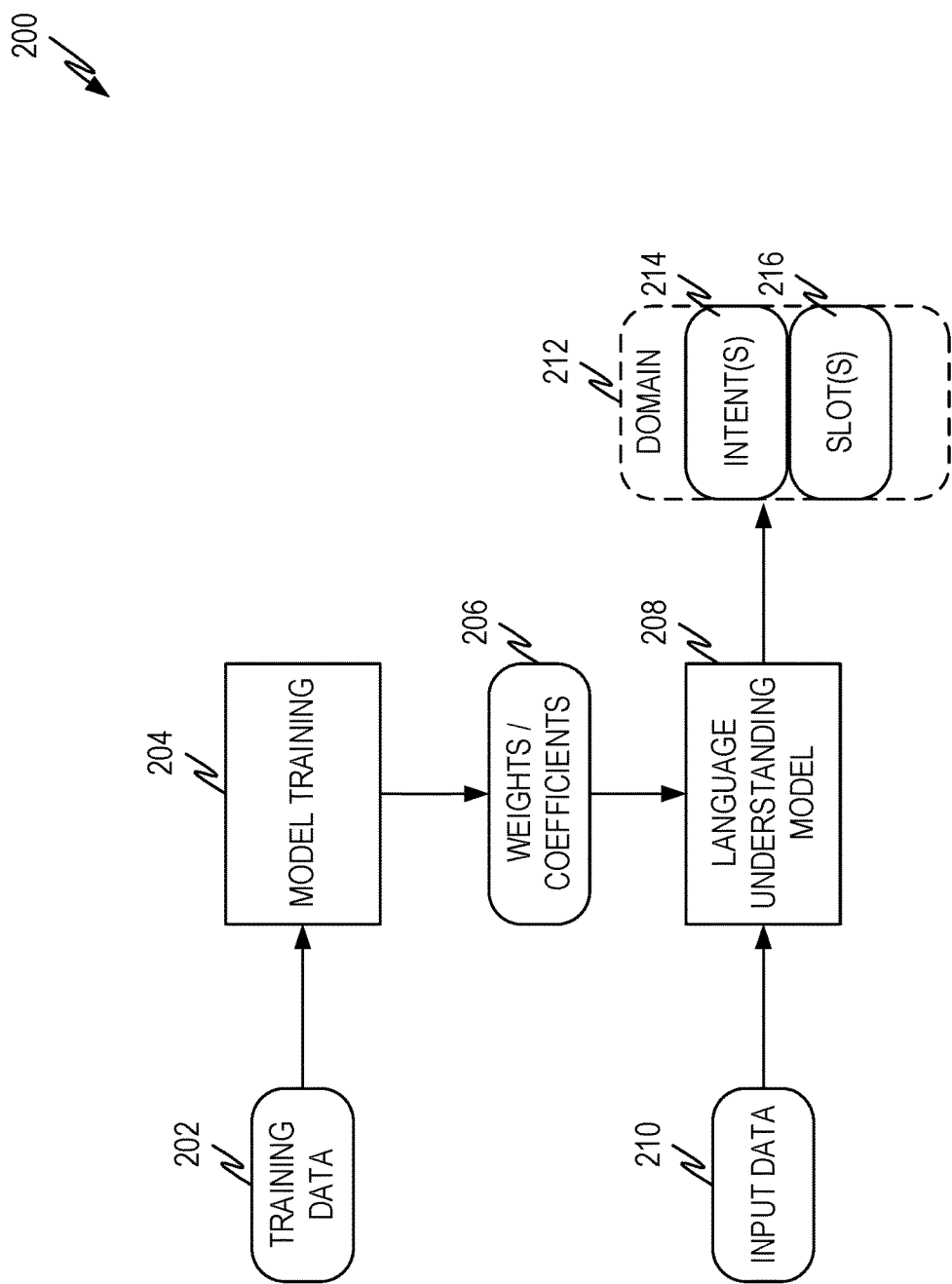
FIG. 2 illustrates an example architecture for training a language understanding model according to some aspects of the present disclosure.

FIG. 2 illustrates an example architecture 200 for training a language understanding model according to some aspects of the present disclosure. Training data 202 is obtained in order to train the machine learning model. Training data typically comes from one of two sources. One source is synthetic data the other is actual data. When building a model for the first time, typically actual data is not available. This is the so called "cold start" problem. To solve the lack of data problem, a set of data is created that is expected to mimic the actual data. The created data is referred to herein as synthetic data. The synthetic data is often created by the developers who are creating the model. However, it is often difficult to predict exactly how users will utilize a given system so it is difficult to predict actual use data. Additionally, creating synthetic data is often time consuming and/or costly and it is difficult to come up with a large body of data that will train the machine learning model to cover all the various user input scenarios. Thus, the machine learning model will not be trained to handle the variety of scenarios that is possible.

After a system has been run for a time using the model trained by synthetic data, actual user data does exist and can be used to retrain the model. The model can then be retrained using the collected user input data.

In the embodiment of FIG. 2, the training data 202 can comprise the synthetic and/or collected user data described above. The training data 202 is then used in a model training process 204 to produce weights and/or coefficients 206 that can be incorporated into the machine learning process incorporated into the language understanding model 208. Different machine learning processes will typically refer to the parameters that are trained using the model training process 204 as weights or coefficients. The terms will be used interchangeably in this description and no specific difference is intended as both serve the same function which is to convert an untrained machine learning model to a trained machine learning model.

Once the language understanding model 208 has been trained (or more particularly the machine learning process utilized by the language understanding model 208), user input 210 that is received by the system and presented to the language understanding model 208 is converted to the semantic representation that includes intent(s) 214 and slot(s) 216 as described herein. As described, the intent(s) 214 and slot(s) 216 can be organized into a set of high level domain(s) 212. For example, the input phrase "reserve a table at joey's grill on Thursday at seven pm for five people" can have the sematic representation of:

Intent: Make_Reservation
Slot: Restaurant: Joey's Grill
Slot: Date: Thursday
Slot: Time: 7:00 pm
Slot: Number_People: 5

Furthermore, the Make_Reservation intent can reside in the Places domain. The domain 212 can be an explicit output of the language understanding model 208 or can be implied by the intent(s) 214 and/or slot(s) 216.

Figure 3:
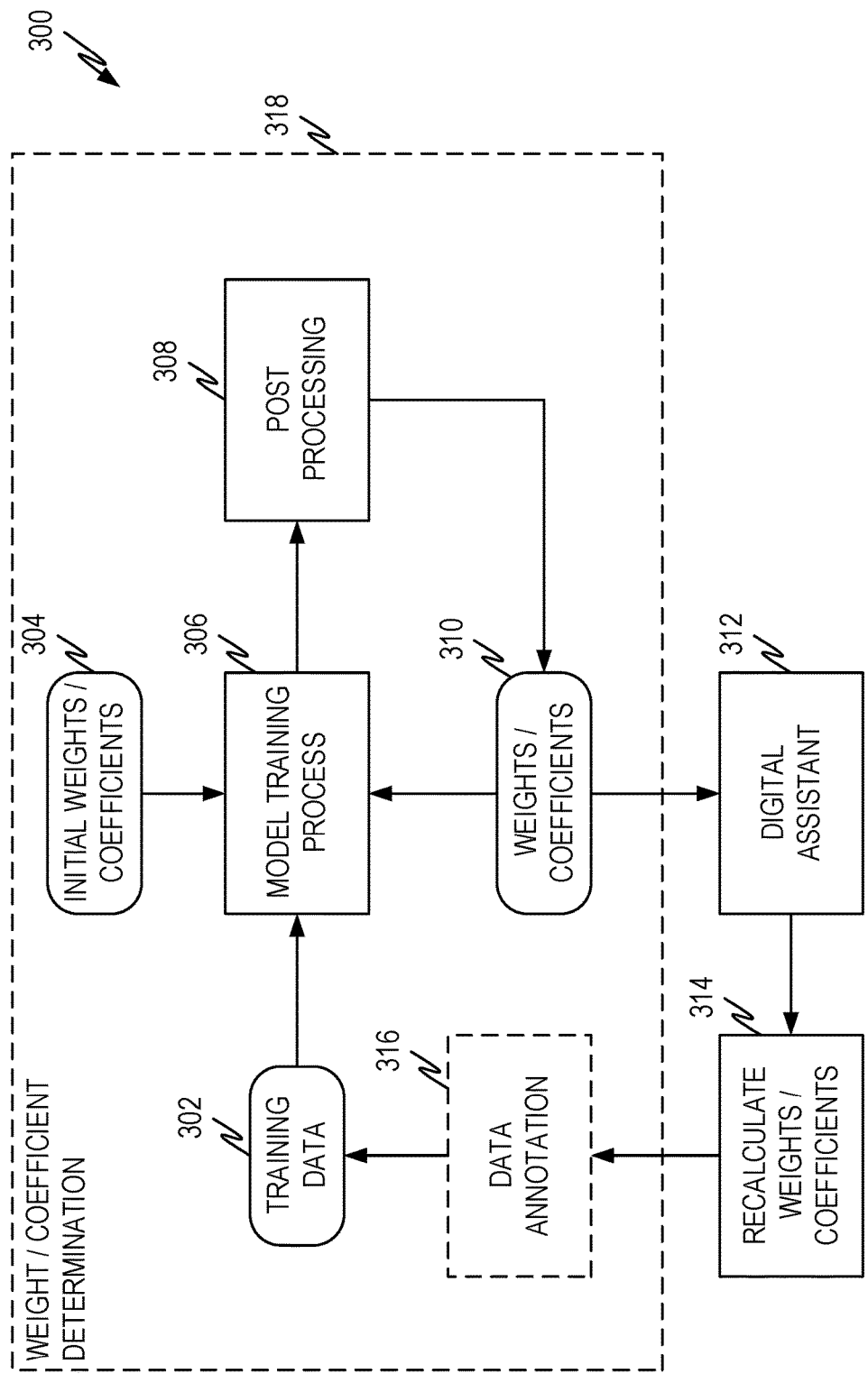
FIG. 3 illustrates an example architecture for training a language understanding model according to some aspects of the present disclosure.

FIG. 3 illustrates an example architecture 300 for training a language understanding model according to some aspects of the present disclosure. This architecture 300 can represent the initial training of a machine learning model or retraining of the model.

The coefficient determination process 318 beings with obtaining a set of training data 302. The set of training data 302 can be the synthetic or actual data discussed above. An initial set of coefficients 304 is applied to the model training process 306 to produce a set of results. A representative model training process 306 to obtain coefficients according to aspects of the disclosure is discussed below.

In some embodiments, the results of the training process 306 are evaluated in a post processing process 308. This post processing process 308 can evaluate the accuracy of the results, can make adjustments and/or corrections to the coefficients 310 and other functions.

The updated coefficients 310 can then be used by the model training process 306, along with the training data 302 and the process repeated until a set of coefficients are determined to represent a sufficiently trained model. The resultant coefficients 310 are then used to create the trained model for the digital assistant 312.

A process to recalculate the coefficients 314 can monitor various trigger events and, upon occurrence of a trigger event, initiate recalculation of the coefficients via the coefficient determination process 318.

The coefficient determination process 318 can be used for supervised or unsupervised training. In supervised training, the training data can be annotated as indicated by data annotation process 316. In the context of determining intents and slots, the input phrases of the training data 302 would each be annotated with the corresponding intent(s), slot(s) and/or domain as appropriate.

Figure 4:
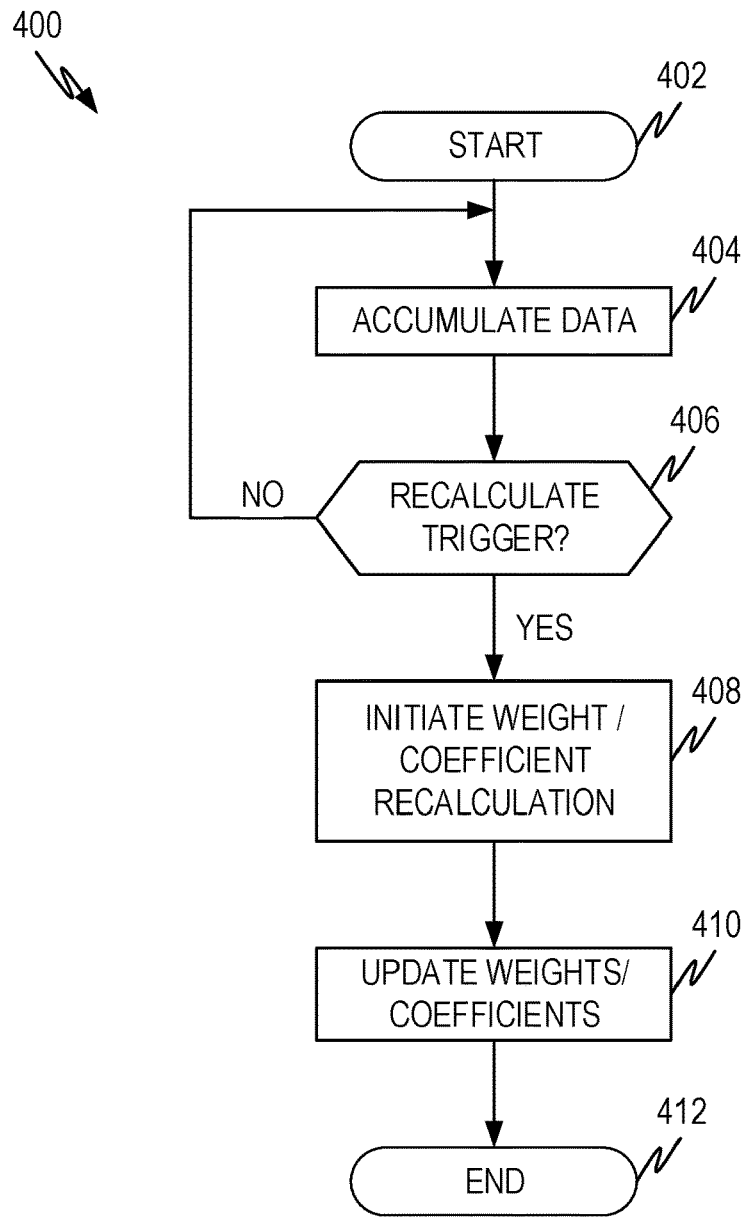
FIG. 4 illustrates a representative flow diagram for triggering retraining of a language understanding model according to some aspects of the present disclosure.

FIG. 4 illustrates a representative flow diagram 400 for triggering retraining of a language understanding model according to some aspects of the present disclosure. For example, this can represent the recalculate coefficients process 314 of FIG. 3.

The process starts in operation 402 and proceeds to operation 404 where input data is accumulated. The accumulated input data will represent the next set of training data, so various methodologies can be used to accumulate data. For example, if a model has been trained using synthetic data for a cold start, the accumulated data can comprise all or a substantial amount of data that occurs between startup and the system and when an recalculation event is triggered as discussed below. Another strategy would be to only maintain the last N input data samples. Where N can be set to be large enough to represent a statistically significant training data sample. There are known methods to calculate what a statistically significant sample is in this context and any of those methods can be used to identify a number corresponding to a statistically sample. Other methods to set N can also be used.

Operation 406 tests for the occurrence of a recalculation event. Recalculation can be triggered on a variety of events, depending on the circumstance. For example, if a cold start scenario exists, the goal may be to retrain the model as soon as a sufficient number of input samples occurs. In this scenario, the triggering event is the number of input samples reaches a set number, M. M can be the same as or different from N above. In another example, the system can monitor the accuracy of intent/slot detection and when the error rate grows beyond a set threshold, the system can identify that the actual distribution of the input data has drifted away from the distribution of the data used to train the model (e.g., the stale data scenario) and declare a triggering event. As yet another example, the model can be periodically or aperiodically retrained based on a schedule, so the passage of time may also be a triggering event. Stated another way, a triggering event can include, but is not necessarily limited to the deployment shift and/or temporal shift described above.

If a triggering event has not occurred, the flow diagram returns to operation 404 (i.e. the "no" branch out of operation 406) where data continues to accumulate according to the accumulation rules, such as those described above. When a triggering occurs, the "yes" branch is taken out of operation 406 to operation 408 where the coefficients are recalculated according to a coefficient recalculation process such as 318 and/or such as described below in conjunction with FIGS. 5-6.

Once updated coefficients are obtained as an output of 408, operation 410 updates the coefficients as provides them to the appropriate components in the system where they can be used. The process then ends at operation 412.

Figure 5:
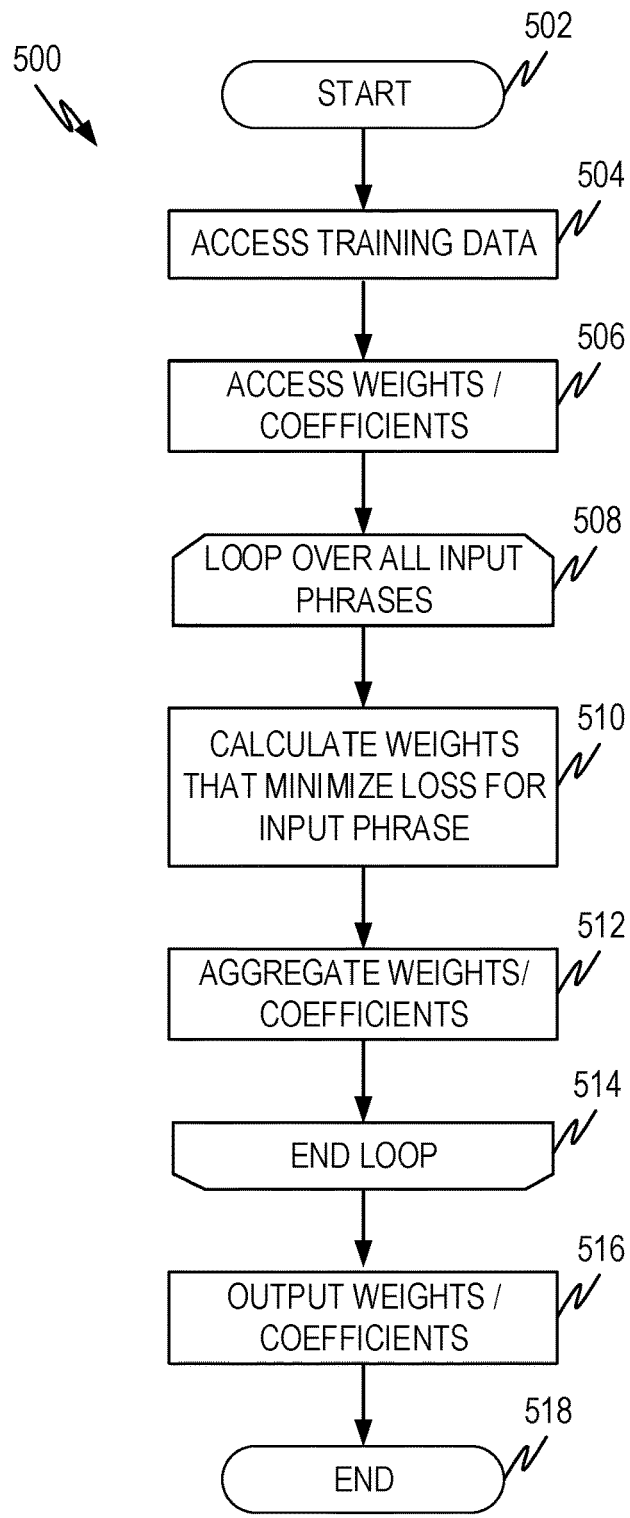
FIG. 5 illustrates a representative flow diagram for retraining a language understanding model according to some aspects of the present disclosure.

FIG. 5 illustrates a representative flow diagram 500 for retraining a language understanding model according to some aspects of the present disclosure. The flow diagram illustrates, for example, a possible implementation for the model training process 306 and/or post processing process 308 of FIG. 3.

The flow diagram begins at operation 502 and proceeds to operation 504 where the training data is accessed. Operation 506 then accesses the current coefficients for the model.

Operations 508-514 form a loop over the input phrases where the coefficients are calculated for individual phrases and averaged or otherwise aggregated to arrive at a final set of coefficients to be used. The loop comprises operations 510 and 512 which calculate coefficients that minimize the aggregate losses for an input phrase and operation 512 which aggregates the coefficients across the input phrases so that a final set of coefficients can best represent the set of training data.

Operation 510 is described in greater detail below in conjunction with FIG. 6. Operation 510 uses a set of selected loss factors and minimizes the aggregate loss across the set of selected losses. The minimization is performed using numerical methods that identify a local minimum for the aggregate loss. Since numerical methods are used, the numerical method steps along the gradient until the system ascertains that the values are close enough to the local minimum to stop the method. Close enough is measured by a difference between one step along the gradient and another. If the difference between the two is smaller than a threshold amount, then the numerical method can exit as discussed below.

Operation 512 aggregates the coefficients to arrive at a set of coefficients that work across the input phrases. In one example, operation 512 can calculate an average of the individual coefficients. For example, if the machine learning model uses coefficients $C_1 \ldots C_x$, operation can calculate the average of all the different $C_1$ coefficients calculated and so forth until $C_x$. Other aggregation methods can be used such as a weighted average, a median, or other measures.

After the individual coefficients have been calculated, the process ends at 518.

Deriving the Loss Models

Before examining how to calculate the machine learning model coefficients, the following section presents a derivation of the loss models used in calculating the coefficients. The loss model is derived for a BiLSTM network used in a language understanding model to perform intent and slot detection. It will work for both supervised and unsupervised learning processes with the modifications described herein.

LSTM is used as a mapping:

$$\phi: \mathbb{R}^d \times \mathbb{R}^{d'} \to \mathbb{R}^{d'}$$

That takes an input vector x and a state vector h and outputs a new state vector h'=φ(x,h). Let C denote the set of character types and W denote the set of word types. Let ⊕ denote the vector concatenation operation. An utterance is encoded using a BiLSTM. The model parameters Θ associated with the BiLSTM are:

Character embedding $e_c \in \mathbb{R}^{25}$ for each $c \in C$
Character LSTMs $\phi_f^C, \phi_b^C: \mathbb{R}^{25} \times \mathbb{R}^{25} \to \mathbb{R}^{25}$
Word embedding $e_w \in \mathbb{R}^{100}$ for each $w \in W$
Word LSTMs $\phi_f^C, \phi_b^C: \mathbb{R}^{150} \times \mathbb{R}^{100} \to \mathbb{R}^{100}$ Let $w_1 \ldots w_n \in W$ denote a word sequence where word $w_i$ has character $w_i(j) \in C$ at position j. First the model computes a character-sensitive word representation $v_i \in \mathbb{R}^{150}$ as:

$$f_j^C = \phi_f^C(e_{w_i(j)}, f_{j-1}^C) \; \forall j=1 \ldots |w_i|$$

$$b_j^C = \phi_b^C(e_{w_i(j)}, b_{j+1}^C) \; \forall j=|w_i| \ldots 1$$

$$v_i = f_{|w_i|}^C \oplus b_1^C \oplus e_{w_i}$$

for i=1 . . . n. For simplicity, random initial state vectors such as $f_0^C$ and $b_{|w_i|+1}^C$ are assumed. Next the model computes $$f_i^W = \phi_f^W(v_i, f_{i-1}^W) \; \forall i=1 \ldots n$$

$$b_i^W = \phi_b^W(v_i, b_{i-1}^W) \; \forall i=n \ldots 1$$

for each I=1 . . . n. For convenience the entire operation is written as a mapping $BiLSTM_\Theta$:

$$(h_1 \ldots h_n) \leftarrow BiLSTM_\Theta(w_1 \ldots w_n)$$

For unsupervised domain adaptation, the source domain data is labeled (annotated) but the target domain data is not. For supervised domain adaptation, both the source domain and target domain data are labeled. The following loss derivation uses three BiLSTM encoders such as that described above. The parameters of the three BiLSTM networks induce source domain-specific features, target domain-specific features, or domain-invariant features. Thus:

1. $\Theta^{src}$: Induces source-specific features
2. $\Theta^{tgt}$: Induces target-specific features
3. $\Theta^{shd}$: Induces domain-invariant features The losses derived below comprise a source side tagging loss, a reconstruction loss, an adversarial domain classification loss, a non-adversarial domain classification loss and an orthogonality loss. In addition, for supervised domain adaptation, a target side tagging loss is also added.

Source Side Tagging Loss

The source side tagging loss is designed to minimize the model's error on labeled training data for the source domain. Let $w_1 \ldots w_n \in W$ be an utterance in the source domain annotated with labels $y_1 \ldots y_n \in L$. The loss uses the source and domain invariant features:

$$(h_1^{src} \ldots h_n^{src}) \leftarrow \text{BiLSTM}_{\Theta^{src}}(w_1 \ldots w_n)$$

$$(h_1^{shd} \ldots h_n^{shd}) \leftarrow \text{BiLSTM}_{\Theta^{shd}}(w_1 \ldots w_n)$$

The probability of a tag $y \in L$ for the $i^{th}$ word is:

$$z_i = W_{tag}^2 \tanh(W_{tag}^1 \overline{h}_i + b_{tag}^1) + b_{tag}^2$$

$$p(y|h_i) \propto \exp([z_i]_y)$$

Where $\overline{h}_i = h_i^{src} \oplus h_i^{shd}$ and $\Theta^{tag} = \{W_{tag}^1, W_{tag}^2, b_{tag}^1, b_{tag}^2\}$ denotes additional learned feed-forward parameters. The tagging loss is given by the negative log likelihood:

$$L^{tag}(\Theta^{src}, \Theta^{shd}, \Theta^{tag}) = -\sum_i \log p(y_i|\overline{h}_i)$$

Where the equation is iterated over annotated words $(w_i, y_i)$ on the source domain side.

Reconstruction Loss

The reconstruction loss uses mean squared errors for reconstruction. The approach uses an attention-based LSTM that fully regenerates the input utterance and uses its log loss. More specifically, let $w_1 \ldots w_n \in W$ be an utterance in the domain $d \in \{src, tgt\}$. The relevant encoders are thus:

$$(h_1^d \ldots h_n^d) \leftarrow \text{BiLSTM}_{\Theta^d}(w_1 \ldots w_n)$$

$$(h_1^{shd} \ldots h_n^{shd}) \leftarrow \text{BiLSTM}_{\Theta^{shd}}(w_1 \ldots w_n)$$

The concatenated vectors $\overline{h}_i = h_i^d \oplus h_i^{shd}$ are input into an attention-based decoder to define the probability of word $w$ at each position $i$ with state vector $\mu_{i-1}$ where $\mu_o = \overline{h}_n$:

$$\alpha_j \propto \exp(\mu_{i-1}^T \overline{h}_j) \; \forall j \in \{1 \ldots n\}$$

$$\tilde{h}_i = \sum_{i=1}^n \alpha_j \overline{h}_j$$

$$\mu_i = \phi^R(\mu_{i-1} \oplus \tilde{h}_i, \mu_{i-1})$$

$$p(w|\mu_i) \propto \exp([W_{rec}^1 \mu_i + b_{rec}^1]_w)$$

where $\Theta^{rec} = \{\phi^R, W_{rec}^1, b_{rec}^1\}$ represent additional parameters. The reconstruction loss is given by the negative log likelihood:

$$L^{rec}(\Theta^{src}, \Theta^{shd}, \Theta^{tgt}, \Theta^{rec}) = -\sum_i \log p(w_i|\mu_i)$$

where the equation is iterated over words $w_i$ in both the source and target utterances.

Adversarial Domain Classification Loss

The adversarial domain classification loss makes shared features (i.e., features shared by both the source and target domains) domain-invariant. The more domain invariant such features are, the easier it is to benefit from the source side training when testing on the target side. Let $w_1 \ldots w_n \in W$ be an utterance in the domain $d \in \{src, tgt\}$. The relevant encoder is the shared encoder (i.e., the encoder that induces domain invariant features):

$$(h_1^{shd} \ldots h_n^{shd}) \leftarrow \text{BiLSTM}_{\Theta^{shd}}(w_1 \ldots w_n)$$

The probability of loss for the domain $d$ for the utterance is:

$$z_i = W_{adv}^2 \tanh\left(W_{adv}^1 \sum_{i=1}^n \overline{h}_i^{shd} + b_{adv}^1\right) + b_{adv}^2$$

$$p(d|h_i) \propto \exp([z_i]_d)$$

where $\Theta^{adv} = \{W_{adv}^1, W_{adv}^2, b_{adv}^1, b_{adv}^2\}$ represent additional learned feed forward parameters. This would imply that the adversarial domain classification loss is given by the positive log likelihood. However, this approach does not achieve the goal of capturing the domain-invariant features when such a loss is minimized. For instance, minimizing the positive log likelihood can lead to a model accurately predicting the opposite domain, thus compromising the goal of inducing domain invariant representations. Thus, the adversarial domain classification loss is instead replaced in this disclosure with:

$$L^{adv}(\Theta^{shd}, \Theta^{adv}) = -\sum_i \log p(d^{(i)}|w^{(i)})$$

where $d^{(i)}$ is set to be the source domain with probability 0.5 or the target domain with probability 0.5. By optimizing for random predictions, the desired effect is achieved, namely the shared parameters are trained to induce features that cannot discriminate between the source domain and the target domain.

Non-Adversarial Domain Classification Loss

The non-adversarial domain classification loss characterizes the non-adversarial loss for domain-specific features. Let $w_1 \ldots w_n \in W$ be an utterance in the domain $d \in \{src, tgt\}$. The relevant encoder is the domain encoder (i.e., the encoder that induces source domain features or target domain features):

$$(h_1^d \ldots h_n^d) \leftarrow \text{BiLSTM}_{\Theta^d}(w_1 \ldots w_n)$$

The domain invariant encoder is not used since the loss relates to domain-specific features. The probability of loss for the domain $d$ for the utterance is:

$$z_i = W_{nadv}^2 \tanh\left(W_{nadv}^1 \sum_{i=1}^n \overline{h}_i^d + b_{nadv}^1\right) + b_{nadv}^2$$

$$p(d|h_i) \propto \exp([z_i]_d)$$

where $\Theta^{nadv} = \{W_{nadv}^1, W_{nadv}^2, b_{nadv}^1, b_{nadv}^2\}$ represent additional learned feed forward parameters. The non-adversarial domain classification loss is given by the negative log likelihood:

$$L^{nadv}(\Theta^d, \Theta^{nadv}) = -\sum_i \log p(d^{(i)} | w^{(i)})$$

where the equation is iterated over domain-annotated utterances ($w^{(i)}$, $d^{(i)}$).

Orthogonality Loss

To further encourage the domain-specific features to be mutually exclusive with the shared (i.e., domain-invariant) features, a soft orthogonality constraint is imposed. Given an utterance $w_1 \ldots w_n \in W$ t in the domain $d \in \{src, tgt\}$, then:

$$(h_1^d \ldots h_n^d) \leftarrow BiLSTM_{\Theta^d}(w_1 \ldots w_n)$$

$$(h_1^{shd} \ldots h_n^{shd}) \leftarrow BiLSTM_{\Theta^{shd}}(w_1 \ldots w_n)$$

The orthogonality loss for the utterance is given by $$L^{orth}(\Theta^{src}, \Theta^{tgt}, \Theta^{shd}) = \sum_i (h_i^d)^T h_i^{shd}$$

The equation is iterated over words i in both the source and target utterances.

Aggregated Losses

For unsupervised training (i.e., annotated data in the source domain and unannotated data in the target domain), the aggregated loss is given by a summation or other aggregation of the losses selected. For example, if all losses were selected, the aggregation of all losses would be jointly minimized. Assuming a summation as the aggregation function, then the loss given by:

$$L^{unsup}(\Theta^{src}, \Theta^{tgt}, \Theta^{shd}, \Theta^{tag}, \Theta^{rec}, \Theta^{adv}, \theta^{nadv}) =$$

$$L^{tag}(\Theta^{src}, \Theta^{shd}, \Theta^{tag}) + L^{rec}(\Theta^{src}, \Theta^{shd}, \Theta^{tgt}, \Theta^{rec}) + L^{adv}(\Theta^{shd}, \Theta^{adv}) +$$

$$L^{nadv}(\Theta^{src}, \Theta^{nadv}) + L^{nadv}(\Theta^{tgt}, \Theta^{nadv}) + L^{orth}(\Theta^{src}, \Theta^{tgt}, \Theta^{shd})$$

Given an utterance, the system computes its tagging, reconstruction, adversarial, non-adversarial and orthogonality losses and takes a gradient step on the sum of these losses. The process is repeated until a local minimum is found within a desired accuracy. As explained below, this is typically done by taking the differences between successive iterations and exiting when the difference falls below a threshold.

For supervised training (i.e., annotated data in both the source and target domain), the tagging loss for the target domain is added. This loss is given by the equations above for source domain tagging loss, substituting the target domain for the source domain:

$$L^{tag}(\Theta^{tgt}, \Theta^{shd}, \Theta^{tag})$$

The aggregate loss for supervised learning is thus the aggregate unsupervised learning loss with the addition of the target side tagging loss:

$$L^{sup}(\Theta^{src}, \Theta^{tgt}, \Theta^{shd}, \Theta^{tag}, \Theta^{rec}, \Theta^{adv}, \Theta^{nadv}) =$$

$$L^{unsup}(\Theta^{src}, \Theta^{tgt}, \Theta^{shd}, \Theta^{tag}, \Theta^{rec}, \Theta^{adv}, \Theta^{nadv}) + L^{tag}(\Theta^{tgt}, \Theta^{shd}, \Theta^{tag})$$

Calculating Aggregated Loss

Figure 6:
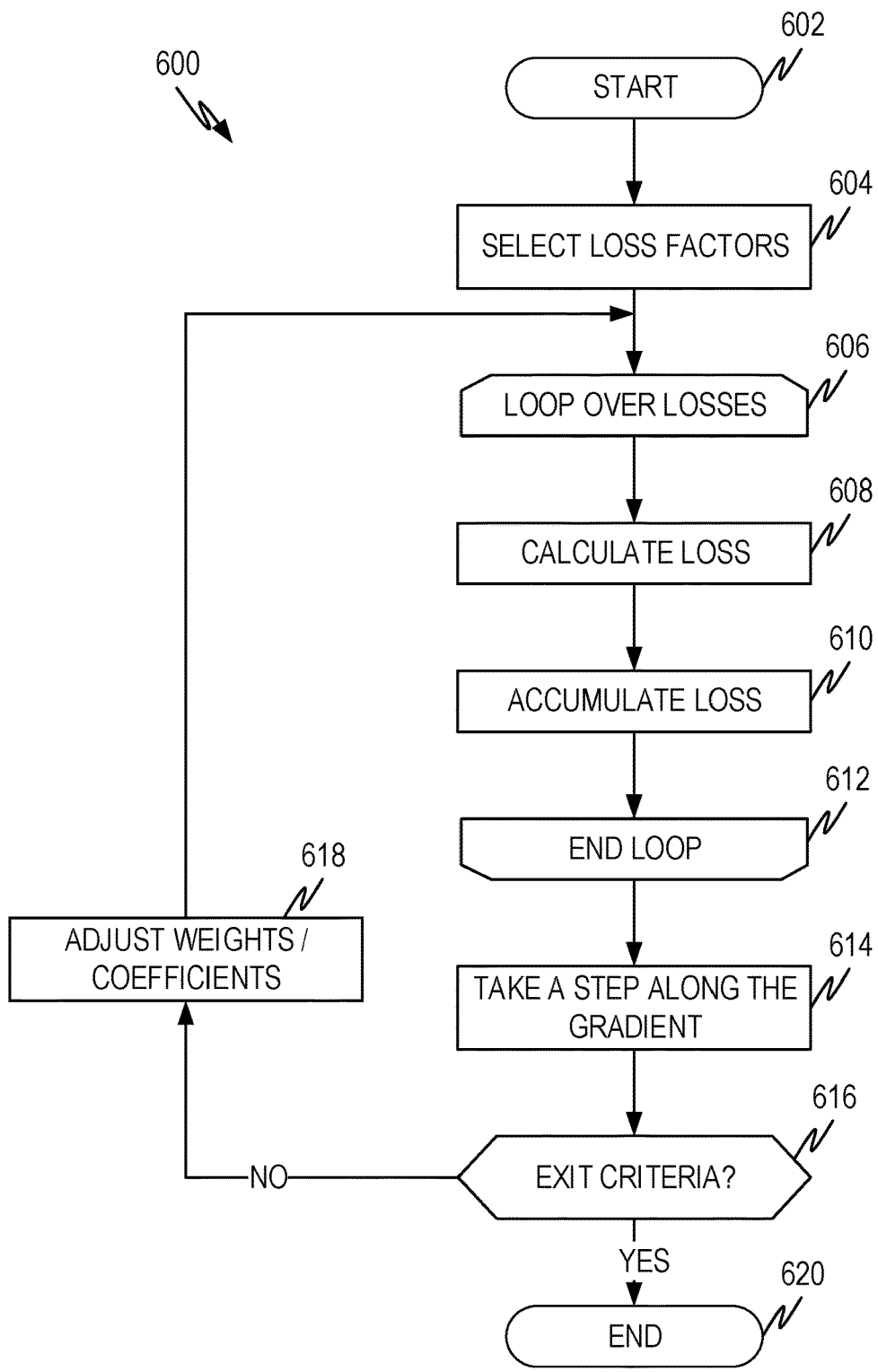
FIG. 6 illustrates a representative flow diagram for accounting for losses when retraining a language understanding model according to some aspects of the present disclosure.

FIG. 6 illustrates a representative flow diagram 600 for accounting for losses when retraining a language understanding model according to some aspects of the present disclosure. The flow diagram starts at operation 602 and proceeds to operation 604 where the loss factors that are to be used in determining the machine learning model coefficients are identified. This will be a subset (e.g., all or less than all) of the loss factors described above for either the supervised or unsupervised losses, depending on which training method is used.

Operations 606, 608, 610, and 612 define a loop where the individual loss factor under consideration is calculated. Operation 606 starts the loss calculation loop and operation 608 calculates the individual loss factor for the loss under consideration using the loss models described above. For example, if operation 608 is calculating the adversarial domain classification loss, the equation:

$$L^{adv}(\Theta^{shd}, \Theta^{adv}) = -\sum_i \log p(d^{(i)} | w^{(i)})$$

will be used as described above. Other losses will be calculated using the other models defined above.

Operation 610 then accumulates the calculated loss, so that the aggregate loss as defined above is calculated. Aggregation can be accomplished by a summation or weighted summation or using some other aggregation method.

Operation 612 ends the loss calculation loop.

When all relevant losses selected by operation 604 have been calculated, execution proceeds to operation 614 where a step along the gradient is calculated. This can be accomplished by using a numerical method such as the method of steepest descent to find a local minimum that represents a joint minimization of the aggregate loss. Other numerical methods can also be used to locate the local minimum.

Operation 616 then tests whether the system has found the local minimum to the desired degree of accuracy. This is typically accomplished by comparing the current step along the gradient to the prior step along the gradient and taking the difference. When the difference between the two steps falls below a threshold amount, the exit criteria is deemed satisfied and the loop exits (i.e., the "yes" branch is taken out of operation 616).

If the exit criteria is not yet satisfied, the coefficients are adjusted in operation 618 and execution proceeds back to operation 606 where the loss factors selected by operation 604 are recalculated using the adjusted weights.

Execution ends at operation 620 when the local minimum is found to the desired degree of accuracy.

Experimental Results

The experimental results presented below illustrate the surprising improvement achieved through the training methodology described herein. The result show significant improvement over other approaches.

The test utilized a suite of five personal assistant domains with two separate tasks in spoken language understanding: 1) intent classification and 2) slot tagging. The intent classification task is a multi-class classification problem with the goal of determining to which one of the n intents a user utterance belongs conditioning on the given domain. The slot tagging task is a sequence labeling problem with the goal of identifying entities and chunking of useful information snippets in a user utterance. For example, a user could say "reserve a table at joeys grill for Thursday at seven pm for five people." Then the goal of the first task would be to classify this utterance as MAKE_RESERVATION intent given the domain PLACES, and the goal of the second task would be to tag "joeys grill" as RESTAURANT, "Thursday" as DATE, "seven pm" as TIME, and "five" as NUMBER_PEOPLE.

Table 1 below contains a summary of the five test domains. The domains have differing levels of granularity (e.g., the number of intents and/or slots in each domain).

TABLE 1

Intents and slots per domain

| Domain | No. of Intents | No. of Slots | Description |
|---|---|---|---|
| Calendar | 23 | 43 | Set appoints in a calendar |
| Communications | 38 | 45 | Make calls and send messages |
| Places | 35 | 64 | Find locations and directions |
| Reminder | 14 | 35 | Remind tasks in a to-do list |
| Weather | 13 | 19 | Get weather information |

The test setup considers two possible domain adaptation scenarios as described above. First, the adaptation of synthetic data to a live user data set (deployment shift). Second, the adaptation of an old data set to a new data set (temporal shift). The first scenario tests whether the approach described herein can effectively adapt a system from experimental, engineered data to real-world, live data. The synthetic data used in the test was manually created by experts based on a given domain schema. The live data is transcribed from users' speech input.

The second scenario tests whether utilized data collected over a one month period in August of 2013 as the "old" data. The "new" data comprised all data between 2014 and 2016.

The training and test data for unsupervised learning is presented in Tables 2 and 3 below. Table 2 contains the training and test data for the deployment shift scenario and Table 3 contains the training and test data for the temporal shift. The "Dev" column shows the set of data used to fine tune the model parameters after the training set. The "Test" column represents the data set used to test performance and produce the results presented herein.

TABLE 2

Scenario 1, Unsupervised Training Data

| Domain | Engineered Training Data | Live User Training Data | Dev | Test |
|---|---|---|---|---|
| Calendar | 16904 | 50000 | 1878 | 10000 |
| Communication | 32072 | 50000 | 3564 | 10000 |
| Places | 23410 | 50000 | 2341 | 10000 |
| Reminder | 19328 | 50000 | 1933 | 10000 |
| Weather | 20794 | 50000 | 2079 | 10000 |
| Average | 23590 | 50000 | 2359 | 10000 |

TABLE 3

Scenario 2, Unsupervised Training Data

| Domain | Old Training Data | New Training Data | Dev | Test |
|---|---|---|---|---|
| Calendar | 13165 | 13165 | 1463 | 10000 |
| Communication | 12631 | 12631 | 1403 | 10000 |
| Places | 21901 | 21901 | 2433 | 10000 |
| Reminder | 16245 | 16245 | 1805 | 10000 |
| Weather | 15575 | 15575 | 1731 | 10000 |
| Average | 15903 | 15903 | 1767 | 10000 |

The results of the testing are presented in Table 4 below. In this table, the SRC is a single LSTM model trained on a source domain without any domain adaptation techniques described herein. The $DA^s$ is an unsupervised domain adaption model with the sentence-level decoder described above.

TABLE 4

Unsupervised Training Accuracy (percentage)

| Task | Domain | Deployment Shift | | Temporal Shift | |
|---|---|---|---|---|---|
| | | SRC | $DA^S$ | SRC | $DA^S$ |
| Intent Detection | Calendar | 47.5 | 84.6 | 50.7 | 88.8 |
| | Communication | 45.8 | 81.2 | 49.4 | 86.2 |
| | Places | 48.5 | 86.3 | 51.7 | 91.1 |
| | Reminder | 50.7 | 88.7 | 53.3 | 92.8 |
| | Weather | 50.3 | 87.1 | 53.4 | 92.2 |
| | Average | 48.5 | 85.6 | 51.7 | 90.2 |
| Slot Tagging | Calendar | 42.4 | 81.7 | 42.2 | 87.9 |
| | Communication | 41.1 | 79.1 | 41.5 | 89.1 |
| | Places | 40.2 | 83.8 | 44.1 | 88.7 |
| | Reminder | 42.6 | 85.7 | 47.4 | 91.2 |
| | Weather | 47.2 | 84.7 | 43.2 | 89.5 |
| | Average | 42.7 | 83.0 | 43.7 | 89.3 |

As noted the domain adaptation training techniques described herein represent a significant improvement over the initially trained models (SRC).

Tables 5 and 6 illustrate the test data for a supervised training data for scenario 1 (deployment shift) and scenario 2 (temporal shift). The number of annotated training data for the supervised training testing was deliberately kept very low (1000) to provide a lower limit measure on the performance of the system with low numbers of annotated data.

TABLE 5

Scenario 1, Supervised Training Data

| Domain | Engineered Training Data | Live User Training Data | Dev | Test |
|---|---|---|---|---|
| Calendar | 16904 | 1000 | 100 | 10000 |
| Communication | 32072 | 1000 | 100 | 10000 |
| Places | 23410 | 1000 | 100 | 10000 |
| Reminder | 19328 | 1000 | 100 | 10000 |
| Weather | 20794 | 1000 | 100 | 10000 |
| Average | 23590 | 1000 | 100 | 10000 |

TABLE 6

Scenario 2, Supervised Training Data

| Domain | Old Training Data | New Training Data | Dev | Test |
|---|---|---|---|---|
| Calendar | 13165 | 1000 | 100 | 10000 |
| Communication | 12631 | 1000 | 100 | 10000 |
| Places | 21901 | 1000 | 100 | 10000 |
| Reminder | 16245 | 1000 | 100 | 10000 |
| Weather | 15575 | 1000 | 100 | 10000 |
| Average | 15903 | 1000 | 100 | 10000 |

The results of the testing are presented in Table 7 below. In this table, the SRC is a single LSTM model trained on a source domain without any domain adaptation techniques described herein. TGT is a single LSTM model trained only on a target domain. The DA is an unsupervised domain adaption model for supervised training as described above. Note that although the supervised training data was quite limited, the performance is respectable. It is anticipated that with larger amounts of training data, the performance will improve significantly. When the relatively low number of annotated data (1,000) is combined with enough unannotated data (50,000) the performance improves. The average for the intent detection in deployment shift raises from 81.7 to 83.6. The average for the slot tagging in deployment shift raises from 76.2 to 77.6. The average for the intent detection in temporal shift raises from 74.9 to 76.5. The average for the slot tagging in temporal shift raises from 71.0 to 71.9.

TABLE 7

Unsupervised Training Accuracy (percentage)

| Task | Domain | Deployment Shift | | | Temporal Shift | | |
|---|---|---|---|---|---|---|---|
| | | SRC | TGT | DA | SRC | TGT | DA |
| Intent Detection | Calendar | 47.5 | 69.2 | 80.7 | 50.7 | 69.2 | 74.4 |
| | Communication | 45.8 | 67.4 | 77.5 | 49.4 | 65.8 | 70.2 |
| | Places | 48.5 | 71.2 | 82.0 | 51.7 | 69.6 | 75.8 |
| | Reminder | 50.7 | 75.0 | 83.9 | 53.3 | 72.3 | 77.2 |
| | Weather | 50.3 | 73.8 | 84.3 | 53.4 | 71.4 | 76.9 |
| | Average | 48.5 | 71.3 | 81.7 | 51.7 | 69.7 | 74.9 |
| Slot Tagging | Calendar | 42.4 | 64.9 | 76.1 | 42.2 | 61.8 | 68.0 |
| | Communication | 41.1 | 62.0 | 73.3 | 41.5 | 61.1 | 67.2 |
| | Places | 40.2 | 61.8 | 72.1 | 44.1 | 64.6 | 70.1 |
| | Reminder | 42.6 | 65.1 | 76.8 | 47.4 | 70.9 | 78.4 |
| | Weather | 47.2 | 71.2 | 82.6 | 43.2 | 64.1 | 71.0 |
| | Average | 42.7 | 65.0 | 76.2 | 43.7 | 64.5 | 71.0 |

Example Machine Architecture and Machine-Readable Medium

Figure 7:
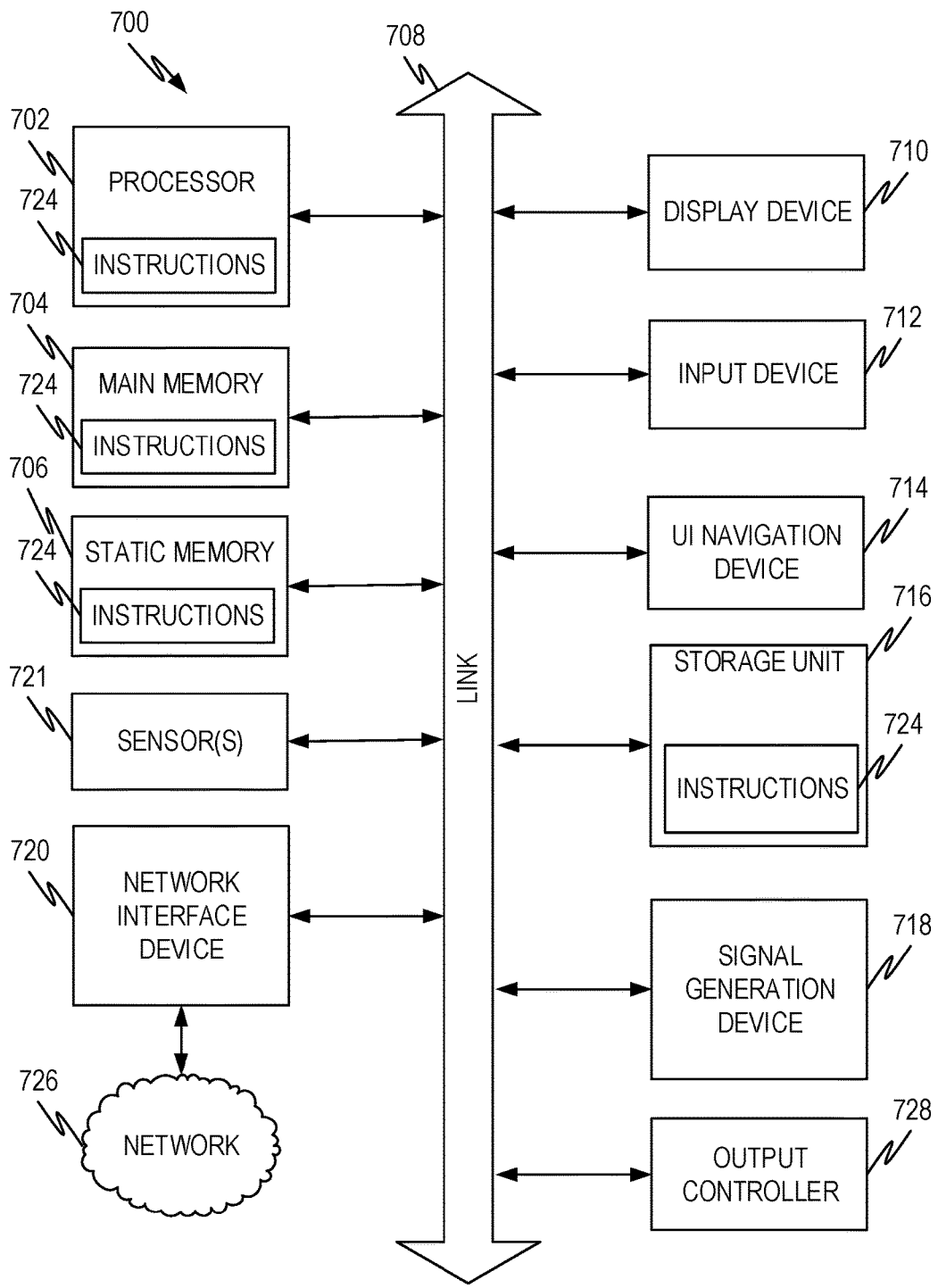
FIG. 7 illustrates a representative machine architecture suitable for implementing the systems and other aspects disclosed herein or for executing the methods disclosed herein.

FIG. 7 illustrates a representative machine architecture suitable for implementing the systems and so forth or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A method for training a language understanding model, comprising:

accessing a set of initial training data used to train a machine learning model of a conversational system and a set of user input data input into the conversational system, the set of initial training data representing possible or actual input into the conversational system;

setting the initial set of training data as a source domain and setting the collected user input as a target domain;

creating a representation of a plurality of losses, each loss based on a source domain, the target domain or both;

defining an aggregate loss comprising the plurality of losses;

determine a set of coefficients for the machine learning model using a numerical method, the determined set of coefficients minimizing the aggregate loss within a threshold amount of a local minimum;

retraining the machine learning model using the determined set of coefficients.

Example 2. The method of example 1 wherein the plurality of losses comprises one or more of:
- a source domain tagging loss;
- a reconstruction loss;
- an adversarial domain classification loss;
- a non-adversarial domain classification loss; and
- an orthogonality loss.

Example 3. The method of example 2 wherein the plurality of losses further comprises the target domain tagging loss.

Example 4. The method of example 2 wherein the source domain tagging loss is derived based on a first BiLSTM network that induces source domain specific features and a second BiLSTM network that induces domain invariant features.

Example 5. The method of example 2 wherein the reconstruction loss is derived based on a first BiLSTM network that induces source domain specific features, a second BiLSTM network that induces target domain specific features, and a third BiLSTM network that induces domain invariant features.

Example 6. The method of example 2 wherein the adversarial domain classification loss is derived based on a first BiLSTM network that induces domain invariant features.

Example 7. The method of example 2 wherein the non-adversarial domain classification loss is derived based on a first BiLSTM network that induces source domain specific features, and a second BiLSTM network that induces target domain specific features.

Example 8. The method of example 2 wherein the orthogonality loss is derived based on a first BiLSTM network that induces source domain specific features, a second BiLSTM network that induces target domain specific features, and a third BiLSTM network that induces domain invariant features.

Example 9. The method of example 1, 2, 3, 4, 5, 6, 7 or 8, wherein the initial training data comprises synthetic data created to cold start the machine learning model and wherein the set of user input data comprises data input into the system after the machine learning model has been trained using the synthetic data.

Example 10. The method of example 1, 2, 3, 4, 5, 6, 7 or 8, wherein the initial training data comprises actual data input into the system prior to a time and wherein the set of user input data comprises data input into the system after the time.

Example 11. A system comprising a processor and computer executable instructions, that when executed by the processor, cause the system to perform operations comprising:

access a set of initial training data used to train a machine learning model of a conversational system and a set of user input data input into the conversational system, the set of initial training data representing possible or actual input into the conversational system;

set the initial set of training data as a source domain and set the collected user input as a target domain;

create a representation of a plurality of losses, each loss based on a source domain, the target domain or both;

define an aggregate loss comprising the plurality of losses;

determine a set of coefficients for the machine learning model using a numerical method, the determined set of coefficients minimizing the aggregate loss within a threshold amount of a local minimum;

retrain the machine learning model using the determined set of coefficients.

Example 12. The system of example 11 wherein the plurality of losses comprises one or more of:
- a source domain tagging loss;
- a reconstruction loss;
- an adversarial domain classification loss;
- a non-adversarial domain classification loss; and
- an orthogonality loss.

Example 13. The system of example 12 wherein the plurality of losses further comprises the target domain tagging loss.

Example 14. The system of example 12 wherein the source domain tagging loss is derived based on a first BiLSTM network that induces source domain specific features and a second BiLSTM network that induces domain invariant features.

Example 15. The system of example 12, 13, or 14 wherein:

the reconstruction loss is derived based on a first BiLSTM network that induces source domain specific features, a second BiLSTM network that induces target domain specific features, and a third BiLSTM network that induces domain invariant features;

the adversarial domain classification loss is derived based on a first BiLSTM network that induces domain invariant features;

the non-adversarial domain classification loss is derived based on a first BiLSTM network that induces source domain specific features, and a second BiLSTM network that induces target domain specific features; and the orthogonality loss is derived based on a first BiLSTM network that induces source domain specific features, a second BiLSTM network that induces target domain specific features, and a third BiLSTM network that induces domain invariant features.

Example 16. A method for training a language understanding model, comprising:

accessing a set of initial training data (202, 302, 504) used to train a machine learning model of a conversational system and a set of user input data (210) input into the conversational system, the set of initial training data representing possible or actual input into the conversational system;

setting the initial set of training data as a source domain and setting the set of user input as a target domain;

creating a representation of a plurality of losses, each loss based on a source domain, the target domain or both (608);

defining an aggregate loss comprising the plurality of losses (610);

determine a set of coefficients for the machine learning model using a numerical method, the determined set of coefficients minimizing the aggregate loss within a threshold amount of a local minimum (614, 616, 618);

retraining the machine learning model using the determined set of coefficients (306).

Example 17. The method of example 16 wherein the plurality of losses comprises one or more of:
a source domain tagging loss;
a reconstruction loss;
an adversarial domain classification loss;
a non-adversarial domain classification loss; and
an orthogonality loss.

Example 18. The method of example 17 wherein the plurality of losses further comprises the target domain tagging loss.

Example 19. The method of example 17 or 18 wherein the source domain tagging loss is derived based on a first BiLSTM network that induces source domain specific features and a second BiLSTM network that induces domain invariant features.

Example 20. The method of example 17, 18, or 19 wherein the reconstruction loss is derived based on a first BiLSTM network that induces source domain specific features, a second BiLSTM network that induces target domain specific features, and a third BiLSTM network that induces domain invariant features.

Example 21. The method of example 17, 18, 19, or 20 wherein the adversarial domain classification loss is derived based on a first BiLSTM network that induces domain invariant features.

Example 22. The method of example 17, 18, 19, 20 or 21 wherein the non-adversarial domain classification loss is derived based on a first BiLSTM network that induces source domain specific features, and a second BiLSTM network that induces target domain specific features.

Example 23. The method of example 17, 18, 19, 20, 21, or 22 wherein the orthogonality loss is derived based on a first BiLSTM network that induces source domain specific features, a second BiLSTM network that induces target domain specific features, and a third BiLSTM network that induces domain invariant features.

Example 24. The method of example 16, 17, 18, 10, 20, 21, 22, or 23 wherein the initial training data comprises synthetic data created to cold start the machine learning model and wherein the set of user input data comprises data input into the system after the machine learning model has been trained using the synthetic data.

Example 25. The method of example 16, 17, 18, 19, 20, 21, 22, 23, or 24 wherein the initial training data comprises actual data input into the system prior to a time and wherein the set of user input data comprises data input into the system after the time.

Example 26. The method of example 16, 17, 18, 19, 20, 21, 22, 23, 24, or 25 wherein the operations further comprise identify a retraining event and, responsive to the retraining event, execute the operations of example 16.

Example 27. The method of example 26 wherein the retraining event comprises receiving a threshold number of input samples.

Example 28. The method of example 26 wherein the retraining event comprises the passage of a period of time.

Example 29. An apparatus comprising means to perform a method as in any preceding example.

Example 30. Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for training a language understanding model, comprising:
    accessing a set of initial training data used previously to train a machine learning model of a conversational system and a set of user input data input into the conversational system and received after the initial training data, the set of initial training data representing possible or actual input into the conversational system;
    setting the initial set of training data as a source domain and setting the set of user input as a target domain;
    creating a representation of a plurality of losses each of a different loss type, each loss based on the source domain, the target domain or both;
    defining an aggregate loss comprising the plurality of losses so that the aggregate loss is a function of both the source domain and the target domain;
    determine a set of coefficients for the machine learning model using a numerical method, the determined set of coefficients minimizing the aggregate loss within a threshold amount of a local minimum; and
    retraining the machine learning model using the determined set of coefficients.

2. The method of claim 1 wherein the plurality of losses comprises one or more of:
    a source domain tagging loss;
    a reconstruction loss;
    an adversarial domain classification loss;
    a non-adversarial domain classification loss; and
    an orthogonality loss.

3. The method of claim 2 wherein the plurality of losses further comprises the target domain tagging loss.

4. The method of claim 2 wherein the source domain tagging loss is derived based on a first BiLSTM network that induces source domain specific features and a second BiLSTM network that induces domain invariant features.

5. The method of claim 2 wherein the reconstruction loss is derived based on a first BiLSTM network that induces source domain specific features, a second BiLSTM network that induces target domain specific features, and a third BiLSTM network that induces domain invariant features.

6. The method of claim 2 wherein the adversarial domain classification loss is derived based on a first BiLSTM network that induces domain invariant features.

7. The method of claim 2 wherein the non-adversarial domain classification loss is derived based on a first BiLSTM network that induces source domain specific features, and a second BiLSTM network that induces target domain specific features.

8. The method of claim 2 wherein the orthogonality loss is derived based on a first BiLSTM network that induces source domain specific features, a second BiLSTM network that induces target domain specific features, and a third BiLSTM network that induces domain invariant features.

9. The method of claim 1 wherein the initial training data comprises synthetic data created to cold start the machine learning model and wherein the set of user input data comprises data input into the system after the machine learning model has been trained using the synthetic data.

10. The method of claim 1 wherein the initial training data comprises actual data input into the system prior to a time and wherein the set of user input data comprises data input into the system after the time.

11. A system comprising at least a processor and computer executable instructions, that when executed by the at least processor, cause the system to perform operations comprising:
- access a set of initial training data used previously to train a machine learning model of a conversational system, the initial training data comprising possible or actual user input into the conversational system;
- access a set of user input data input into the conversational system after initial training of the conversational system;
- set the initial set of training data as a source domain and set the set of user input as a target domain;
- create a representation for each of a plurality of losses each of a different loss type, each loss based on the source domain, the target domain, or both;
- define an aggregate loss comprising the plurality of losses;
- determine a set of coefficients for the machine learning model using a numerical method, the determined set of coefficients minimizing the aggregate loss within a threshold amount of a local minimum; and
- retrain the machine learning model using the determined set of coefficients.

12. The system of claim 11 wherein the plurality of losses comprises one or more of:
- a source domain tagging loss;
- a reconstruction loss;
- an adversarial domain classification loss;
- a non-adversarial domain classification loss; and
- an orthogonality loss.

13. The system of claim 12 wherein the plurality of losses further comprises a target domain tagging loss.

14. The system of claim 12 wherein the source domain tagging loss is derived based on a first BiLSTM network that induces source domain specific features and a second BiLSTM network that induces domain invariant features.

15. The system of claim 12 wherein the reconstruction loss is derived based on a first BiLSTM network that induces source domain specific features, a second BiLSTM network that induces target domain specific features, and a third BiLSTM network that induces domain invariant features.

16. The system of claim 12 wherein the adversarial domain classification loss is derived based on a first BiLSTM network that induces domain invariant features.

17. The system of claim 12 wherein the non-adversarial domain classification loss is derived based on a first BiLSTM network that induces source domain specific features, and a second BiLSTM network that induces target domain specific features.

18. The system of claim 12 wherein the orthogonality loss is derived based on a first BiLSTM network that induces source domain specific features, a second BiLSTM network that induces target domain specific features, and a third BiLSTM network that induces domain invariant features.

19. A computer storage medium comprising executable instructions that, when executed by a processor of a machine, cause the machine to perform operations comprising:
- access a set of initial training data used previously to train a machine learning model of a conversational system, the initial training data comprising possible or actual user input into the conversational system;
- access a set of user input data input into the conversational system after initial training of the conversational system;
- set the initial set of training data as a source domain and set the set of user input as a target domain;
- select two or more loss factors, each of which are a function of the source domain, the target domain, or both, the two or more loss factors comprising:
  - a source side tagging loss;
  - a reconstruction loss;
  - an adversarial domain classification loss;
  - a non-adversarial domain classification loss; and
  - an orthogonality loss;
- define an aggregate loss comprising the selected loss factors;
- determine a set of coefficients for the machine learning model using a numerical method, the determined set of coefficients minimizing the aggregate loss within a threshold amount of a local minimum; and
- retrain the machine learning model using the determined set of coefficients.

20. The medium of claim 19 wherein the operations further comprise identify a retraining event and, responsive to the retraining event, execute the operations of claim 19.

* * * * *